Dec. 13, 1927.　　　　　　　　　　　　　　　　1,652,410
A. W. PLATT
SHEET GLASS ABRADING MEANS
Filed Nov. 18, 1926　　　　3 Sheets-Sheet 1
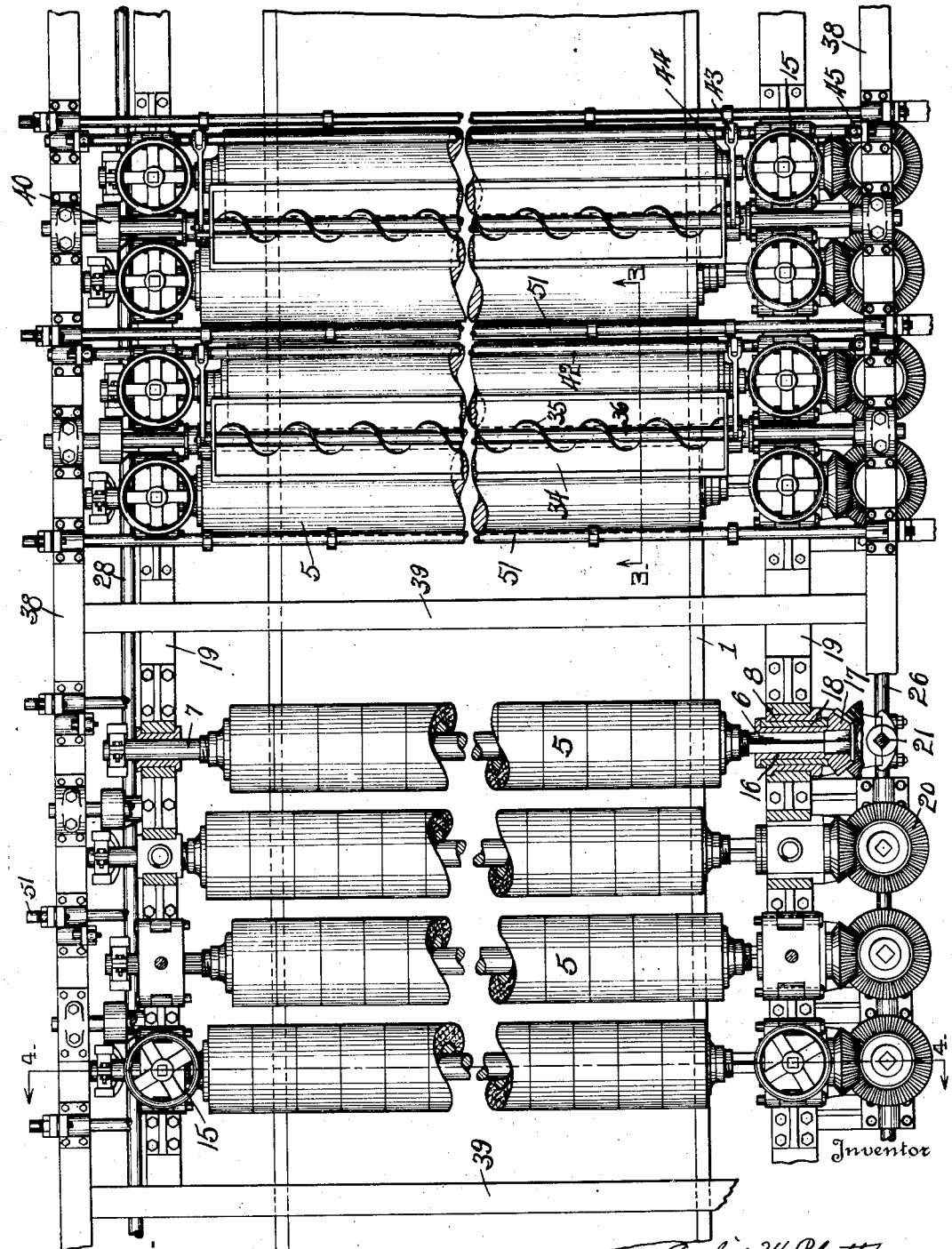

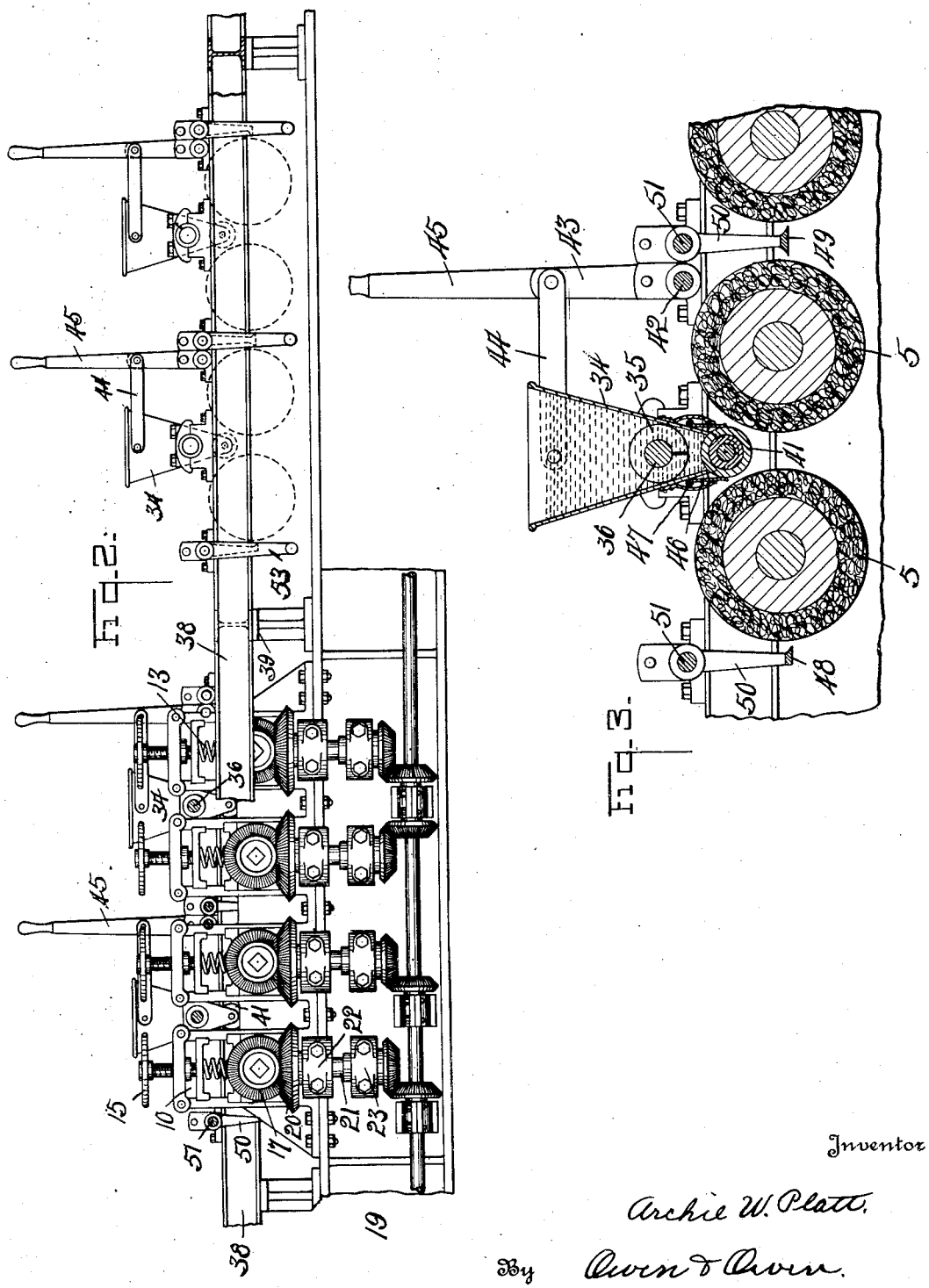

Dec. 13, 1927.
A. W. PLATT
1,652,410
SHEET GLASS ABRADING MEANS
Filed Nov. 18, 1926    3 Sheets-Sheet 3
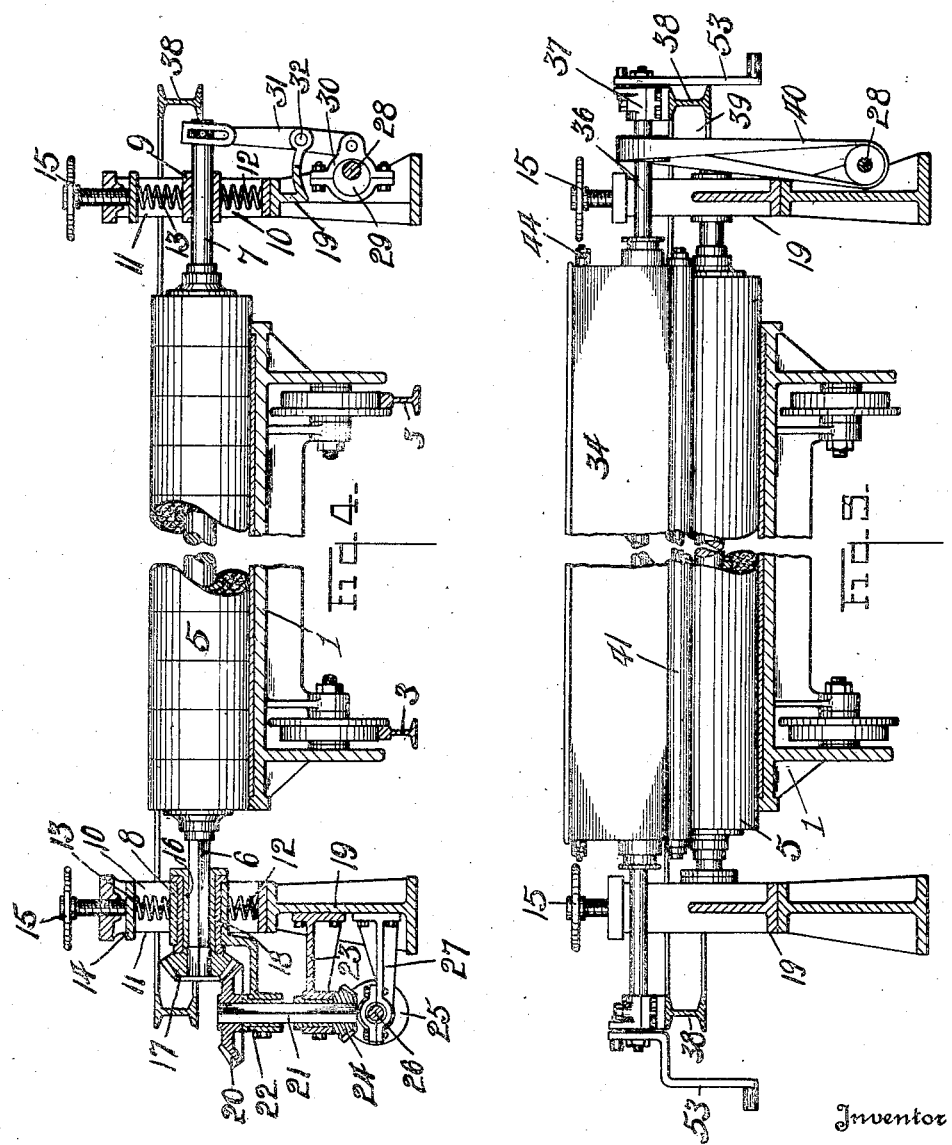
Inventor
Archie W. Platt,
By
Attorneys.

Patented Dec. 13, 1927.

1,652,410

UNITED STATES PATENT OFFICE.

ARCHIE W. PLATT, OF TOLEDO, OHIO, ASSIGNOR TO THE EDWARD FORD PLATE GLASS COMPANY, OF ROSSFORD, OHIO, A CORPORATION OF OHIO.

SHEET-GLASS-ABRADING MEANS.

Application filed November 18, 1926. Serial No. 149,018.

This invention relates to apparatus for the grinding and/or polishing of plate or sheet glass, and particularly to apparatus of this character adapted for the grinding and polishing of plate glass by passing the same in a practically continuous sheet or in a continuous train or series of strips or sections beneath and in contact with abrading rolls or other members.

The object of the invention is the provision of various features of improvement in apparatus of this character whereby to enhance the practicability and commercial value thereof.

The invention is fully described in the following specification, and while in its broader aspect it is capable of embodiment in different forms, one embodiment thereof is illustrated in the accompanying drawings, in which,—

Figure 1 is a top plan view of an apparatus embodying the invention with parts broken away. Fig. 2 is a side elevation thereof. Fig. 3 is an enlarged fragmentary section on the line 3—3 in Fig. 1. Fig. 4 is a section on the line 4—4 in Fig. 1, and Fig. 5 is a section on the line 5—5 in Fig. 1.

Referring to the drawings, 1 designates a conveyor which may comprise a plurality of trucks traveling on a track 3 and forming a train of any desired length with the separate trucks or units thereof in end abutting relation so as to form a substantially uninterrupted top glass supporting surface. The trucks have flat top surfaces to support the sheet or plate glass 4 to be treated, and the glass may be fed thereon in continuous sheet form from a source of supply or may be cast and rolled thereon or may constitute separate strips or sections of previously formed plate or sheet glass, as well understood in the art. The present invention does not pertain to the manner of supplying the glass to or mounting it on the conveyor, but to the treatment of the glass on the conveyor to grind and/or polish the same.

One or more abrading rolls 5, in the present instance four in number and preferably felt covered, are disposed crosswise of the conveyor with their peripheries in abrading contact with the top surface of the glass mounted on the conveyor, whereby a rotation of the rolls will effect a grinding or polishing of the glass. The end trunnions 6 and 7 of each roll are mounted in respective bearing boxes 8 and 9 for both rotary and axial movements, and these boxes in turn are mounted in the openings 10 of guide members 11 for vertical reciprocatory or floating movements therein. The boxes 8 and 9 are yieldingly supported by springs 12 in the bottoms of the guide-ways 10, and a spring 13 is disposed on top of each bearing box and has its upper end thrust against a plate 14, which in turn bears upward against an adjusting screw 15. The bottom springs 12 are of sufficient stiffness to overcome the weight of the roll 5 and to raise it from contact with the glass when the springs are extended. The rolls are then lowered to contact with the glass and the abrading pressure thereof adjusted by a downward turning of the screws 15 to tension the springs 13.

The bearing boxes 9 are of any suitable type to permit rotary and axial movements of the trunnions 7 therein. The trunnions 6, however, are square or of other irregular form in cross-section and fitted for sliding but not turning movements in a sleeve 16 carrying a bevel pinion 17 at its outer end, so that a driving of the pinion will effect a driving of the roll. The sleeve 16 is mounted in a bushing 18 that is journaled in the bearing box 8. The sleeve 16 is flanged or shouldered at each end of the bushing 18 and said bushing is shouldered at each end of the bearing box 8, thereby preventing relative axial movements of such parts.

The several guide members 11 are mounted on the side frame member or rail 19, one of which is mounted at each side of the conveyor lengthwise thereof. The pinion 17 is in mesh with a companion bevel pinion 20 mounted on the upper end of a vertically disposed shaft 21, which is mounted for turning movements in the outer end of a bearing arm 22 projecting from the bearing box 8. The shaft 21 is journaled at its lower end in an arm 23 projecting from the adjacent frame member 19 and carries a bevel pinion 24 in mesh with a companion pinion 25 on the line shaft 26. The shaft 26 is journaled in bearing arms 27 projecting from the frame member 19. The shaft 21, while rotating with both pinions 20 and 24, has axial sliding movements with respect to one or the other thereof to accommodate the vertical movements of the bearing box 8 and its bearing arm 22.

A shaft 28 is journaled in the opposite frame member 19 to that which carries the shaft 26, and this shaft (28) is provided with an eccentric 29 for each roll 5, which eccentric is loosely embraced by the yoke 30. A lever 31 is fulcrumed to the frame member at a point above the yoke 30, as at 32, and has its lower end pivoted to the yoke and its upper end straddling the outer end portion of the associated end trunnion 7 and in pin and slot connection therewith so that a rocking of the lever will impart axial movements to the roll. It is thus apparent that as the roll is rotated by reason of its driving connection with the shaft 26, it is also moved axially backward and forward across the work by the movement imparted thereto from the eccentric 29—30.

Between each pair of rolls 5 is mounted a hopper 34 for containing a polishing material and provided in its bottom portion with an agitating work or member 35, the shaft 36 of which extends at its ends beyond the ends of the hopper 34 and are journaled in bearings 37 on side frame members 38. These frame members are disposed above and without the side frame members 19 and are carried by cross frame members 39 that are mounted on and project beyond the main frame members 19. The agitator shaft 36 is driven from the shaft 28 by a belt and pulley connection 40.

The ends of the hopper 34 are journaled on the shaft 36 so that the hopper is supported by the shaft and is adapted to have rocking movements about the same as an axis. The hopper 34 is of V-form, or at least has its lower portion of narrowed form so as to project down between the upper portions of the associated pair of rolls 5. A bottom opening is provided in the hopper throughout its length and this is substantially closed by a distributing roll 41, which has its top surface exposed to the material within the hopper. The roll is preferably felt covered and upon a turning thereof a portion of the material adheres to the roll covering and passes therewith from the hopper. When the hopper is in vertical or neutral position, the distributing roll 41 is free from engagement with either roll 5 and upon a swinging of the hopper the roll 41 is moved into peripheral engagement with one or the other of the polishing rolls 5 and the polishing or abrading material, or at least a portion thereof which is carried by the distributing roll is transferred to the surface of the polishing roll. A rock shaft 42 is mounted on the frame members 38 parallel to the rocking axis of the hopper and has an arm 43 rising therefrom at each end of the hopper and connected to the hopper by a link 44, so that rocking movements of the shaft 42 are communicated to the hopper. A handle 45 is provided at each end of the shaft 42 for rocking the same.

An apron 46 pivotally hangs down from each side of the hopper 34 and bears at its free edge against the surface of the distributing roll 41 and tends to prevent too much of the polishing material from being distributed by the roll to the polishing roll. Each of these aprons is yieldingly held in engagement with the distributing roll by one or more springs 47.

In order to clean and condition the surface of the rolls 5 when desired, I provide a scraper 48 at the outer side of each outer roll 5 of a set and provide a double scraper 49 between the two center rolls of the set, the former being adapted to be moved into scraping engagement with the surfaces of the respective outer rolls and the latter being adapted to be moved into scraping engagement with the surface of either one of the intermediate rolls, as desired. Each of the scrapers 48 and 49 is carried by a respective set of arms 50 depending from an associated rock shaft 51 that extends crosswise of the apparatus and is journaled at its ends in bearings 52 on the frame members 38. A crank 53 is carried by each end of each shaft 51 without the respective frame members 38.

I wish it understood that my invention is not limited to any specific arrangement, construction or form of the parts, as it is capable of embodiment in numerous forms without departing from the spirit of the claims.

Having thus described my invention, what I claim as new and desire to secure by Letters Patent is:

1. In an apparatus of the class described, a pair of polishing rolls disposed in transversely spaced parallel relation, a receptacle mounted for rocking movements above the roll axes and substantially midway therebetween and having a narrow bottom portion with a discharge opening therein extending a distance between the rolls, a distributing roll carried by the receptacle and substantially closing the bottom opening and adapted to be moved into engagement with the periphery of either polishing roll by a rocking of the receptacle.

2. In an apparatus of the class described, a polishing roll, a receptacle for a polishing material mounted above and to one side of the roll axis and having a bottom discharge opening, a shaft extending through and supporting the receptacle for rocking movements and being parallel to the roll axis, agitating means mounted on the shaft within the receptacle, a distributing member carried by the receptacle and substantially closing the bottom opening thereof, said member being movable into engagement with the periphery of the roll by a rocking of the receptacle, and means for rocking the receptacle.

In testimony whereof I have hereunto signed my name to this specification.

ARCHIE W. PLATT.